US011816712B1

(12) United States Patent
Portman et al.

(10) Patent No.: US 11,816,712 B1
(45) Date of Patent: Nov. 14, 2023

(54) SYSTEMS AND METHODS FOR GENERATION, EXECUTION AND EVALUATION OF SYNTHETIC SHOPPING SESSIONS

(71) Applicant: Amazon Technologies, Inc., Seattle, WA (US)

(72) Inventors: Leon Portman, Givatayim (IL); Gary Weiss, Givatayim (IL); Yotam Yarden, Tel-Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 17/031,562

(22) Filed: Sep. 24, 2020

(51) Int. Cl.
*G06Q 30/0601* (2023.01)
*G10L 15/26* (2006.01)
*G06F 16/9032* (2019.01)

(52) U.S. Cl.
CPC ... *G06Q 30/0603* (2013.01); *G06F 16/90332* (2019.01); *G06Q 30/0625* (2013.01); *G06Q 30/0641* (2013.01); *G10L 15/26* (2013.01)

(58) Field of Classification Search
CPC ...... G06Q 30/02–0205; G06Q 30/0601–0643; G06F 16/90332; G10L 15/26
See application file for complete search history.

(56) References Cited

U.S. PATENT DOCUMENTS

| | | | | |
|---|---|---|---|---|
| 10,140,089 | B1* | 11/2018 | Paranjpe | G10L 19/0018 |
| 10,224,030 | B1* | 3/2019 | Kiss | G06F 40/284 |
| 10,565,498 | B1* | 2/2020 | Zhiyanov | G06N 7/005 |
| 2019/0325068 | A1* | 10/2019 | Lai | G06F 16/583 |
| 2021/0142782 | A1* | 5/2021 | Wolf | G10L 13/08 |
| 2021/0233129 | A1* | 7/2021 | Bikumala | G06F 18/24 |
| 2021/0241774 | A1* | 8/2021 | Aalipour Hafshejani | |
| | | | | G10L 15/26 |

OTHER PUBLICATIONS

"A Voice Controlled E-Commerce Web Application". Mandeep Singh Kandhari. Farhana Zulkernine. Haruna Isah. 2018 IEEE 9th Annual Information Technology, Electronics and Mobile Communication Conference (IEMCON). (Year: 2018).*

* cited by examiner

*Primary Examiner* — William J Allen
(74) *Attorney, Agent, or Firm* — Eversheds Sutherland (US) LLP

(57) ABSTRACT

Systems, methods, and computer-readable media are disclosed for determining a synthetic audible utterance regarding a product, processing the audible utterance via a catalog service to determine a result and determining the relevance of the result and/or success of the catalog service for benchmarking, marketing, and catalog service improvement purposes. The audible utterance may be based on the product and/or product information as well as an intended action to be performed by the catalog service corresponding to the synthetic utterance. A relevance score may be generated using an embedding algorithm to determine the accuracy and/or appropriateness of the action performed by the catalog service.

20 Claims, 6 Drawing Sheets

SYSTEMS AND METHODS FOR GENERATION, EXECUTION AND EVALUATION OF SYNTHETIC SHOPPING SESSIONS

BACKGROUND

Today it is common place to purchase items using a computer or even a smart phone connected to the internet. It is even possible to search for, review product information, compare products, and purchase products by communicating audibly with an electronic device connected to the Internet. For example, one may audibly request information about a certain product, an electronic device may determine and audibly respond with information about that product and may even complete a purchase of a product in response to a request to purchase a product. While electronic devices may audibly present information about products and purchase products in response to audible commands, it may be difficult to accurately process the voice commands and otherwise accurately perform the requested action. It may further be difficult to gauge the performance of such systems.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
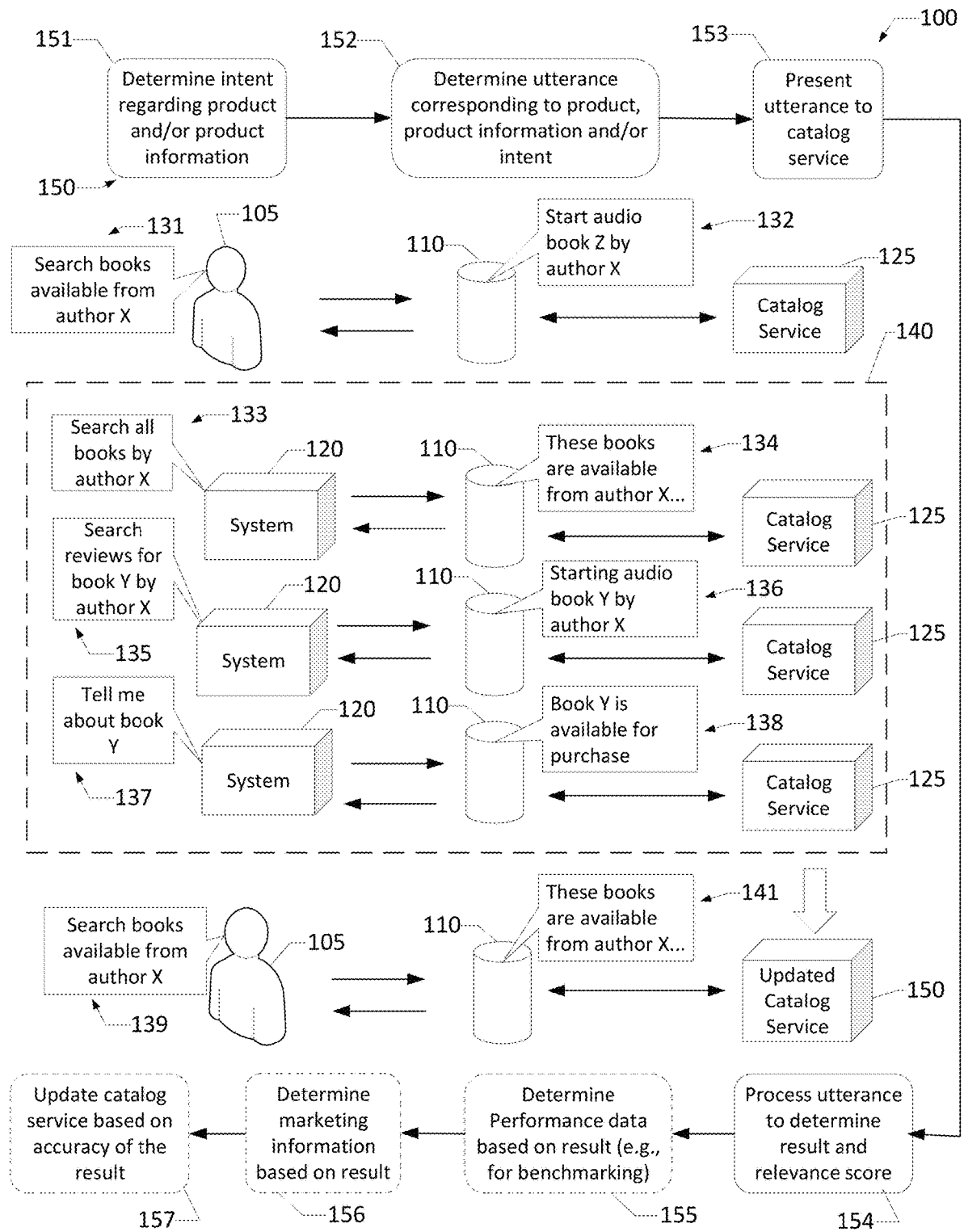
FIG. 1 is a schematic illustration of an example use case for determining synthetic utterances and analyzing the response to such utterances, in accordance with one or more example embodiments of the present disclosure.

The systems and methods herein may be used to determine synthetic utterances (e.g., computer generated utterances) including and/or indicative of commands or instructions using a system. The synthetic utterances may be processed by a catalog service to determine relevant product information and/or perform certain product related tasks or actions. For example the catalog service may, based on the synthetic utterance, determine a relevant product, determine that the utterance involves a request for product information, and may determine certain product information relevant to the identified product and synthetic utterance (e.g., result data). The result data may be analyzed by the system to determine the relevance of the response and/or the performance of the catalog service in processing and responding to the synthetic utterance. This analysis may used for benchmarking purposes to analyze the performance of the catalog service. In one example, large amounts of synthetic utterances (e.g., thousands) may be generated and processed to determine errors and shortcomings of the catalog service. For example, with respect to a product type, an error or issue associated with a particular action (e.g., placing a product in a digital shopping cart), and/or any other part of the user experience may be identified. Further, the result data from various synthetic utterances may be analyzed to determine information relevant to marketing. For example, the result data may indicate that certain utterances are far superior at eliciting the correct response from the catalog service and those utterances may be promoted and/or used in marketing materials. Further, based on this analysis, the catalog service may optionally be trained using the synthetic utterance and result data, and/or information indicative thereof, to improve the performance of the catalog service.

The catalog service may run on one or more computing devices (e.g., servers) and may communicate and coordinate with an electronic device that may be connected to the Internet and the computing devices to present information (e.g., dialog, product information, music, audio book, podcast, news, comedy, games, recipes, instructions, stories, and/or any other audible media content) determined by and/or obtained from the catalog service. For example, an electronic device may include a processor, a communications unit, a microphone, and a speaker and may communicate with a server over the Internet. The electronic device may receive and process spoken and/or audible commands, may convert the command into digital instructions, and may relay the command or instructions to the server. In one example, the command may include a request for product information and/or a request to purchase a product.

The system may include an intent generator and an utterance generator to determine a synthetic utterance or utterances. In one example, the utterances may have slight variations in language and/or other voice and audio parameters. A product or product information may be determined for the synthetic utterance. The intent generator may further determine a goal, action or intent corresponding to the product or product information (e.g., determine product information, determine product price, compare product, purchase product, place product in list, place product in shopping list). The utterance generator may process the product, product information, goal, intent, and/or action and may determine an audible utterance including computer generated words and may organize the words into sentences and/or phrases that are designed to elicit from the catalog service the goal, action and/or intent regarding the product or product information. The system may send and/or otherwise share the utterance and/or information indicative thereof with the catalog service.

The catalog service may be a platform run on a server and/or electronic device to process instructions and/or requests from users (e.g. in the form of audible utterances), determine a goal, action or intent from the audible utterance and a corresponding product and/or product information, determine relevant information on the catalog service, optionally perform another action on the catalog service, and generate result data indicative of the relevant information and/or action performed. The result data may include an audible utterance and/or display information that may be presented on the electronic device and/or other devices (e.g., a television, tablet, smart phone, or the like). The result data may be sent to and/or otherwise determined by the system.

The system may further include a relevance engine and a success analyzer. The relevance engine may analyze the result data from the catalog service to determine the relevance and/or accuracy of the result data. Additionally, the relevance engine may optionally analyze intent data from the utterance generator and/or intent generator that may include and/or be indicative of a product, product information, the goal, intent and/or action, and/or the utterance. The relevance engine may process the foregoing information using an embedding algorithm which may be one or more algorithms and/or neural networks, such as an embedding neural network. The output of the relevance engine may be a value indicative of how relevant the result data is to the synthetic utterance or information therein. The success analyzer may further analyze the intent data, result data and/or output of the relevance engine to analyze the performance of the catalog service and/or determine the accuracy of the catalog service. For example, the success analyzer may determine the accuracy of the utterance and/or analyze the effect of certain parameters in an utterance (e.g., audible parameters, language parameters, etc.). Further the success analyzer may train and/or facilitate training of the catalog service using the output of the relevance engine and/or success analyzer.

Referring to FIG. 1, an example use case 100 for determining synthetic utterances using a system, processing the utterances using catalog service to determine result data and/or accuracy information and updating the catalog service based on the result data and/or accuracy information is illustrated in accordance with one or more example embodiments of the disclosure. In the illustrated example, electronic device 110 may communicate over the Internet with a server, which may be one or more servers, running system 120 and catalog service 125. Catalog service 125 may maintain a database of product information (e.g., product type, product identifiers, produce titles, product reviews, product images and/or videos, product descriptions, product inventory, product model numbers, manufacturer information, etc.). Catalog service 125 may be used to search the database, to purchase a product, to add a product to a list (e.g., digital shopping cart, wish list), and the like. Catalog service 125 may coordinate with a local application on electronic 110 to analyze and process audible utterances from a user and may perform an action and/or provide information regarding a product identified in the audible utterance. System 120 may be used to generate synthetic audible utterances (e.g., computer generated audible utterances) regarding one or more products, product information, and/or an action performed by the catalog service). It is understood that the terms audible utterance and synthetic utterance used herein may include textual (e.g., written) utterances.

Electronic device 110 may be any electronic device that may communicate with one or more servers and/or other electronic devices, via any well-known wired or wireless system (e.g., Wi-Fi, cellular network, Bluetooth, Bluetooth Low Energy (BLE), near field communication protocol, etc.). Electronic device 110 may be any computing device with a processor and may preferably include one or more microphones and one or more speakers. In the example illustrated in FIG. 1, electronic device 110 is a connected device comprising a processor, a microphone and a speaker, however it is understood that an electronic device may be a smart phone, tablet, desktop computer, laptop computer, e-reader, wearable device, smart speaker, or the like. Electronic device 110 may run a local application to facilitate communication with a server and otherwise process instructions and/or perform operations based on commands received from the server. The local application may be one or more applications or modules run on and/or accessed by electronic device 110. It is understood that the electronic devices may alternatively be emulated (e.g., on a server). Accordingly, it is understood that the operations and tasks performed by electronic device 110 herein may be performed by an emulated electronic device running on a server and designed to perform and operate the same as electronic device 110. The server may be the same server running the system and/or catalog service (e.g., system 120 and/or catalog service 125) or may be a different server.

The server may be one or more computing devices (e.g., one or more servers) in communication with the electronic device 110. For example, the server may be server 600 described in more detail below with respect to FIG. 6. The server may include one or more servers and/or otherwise communicate with other servers, databases, datastores, and the like. The server may be a computing device with a processor and may run one or more applications and/or platforms (e.g., system 120 and catalog service 125) in communication with the local application running on electronic device 110. It is understood that system 120 and catalog service 125 may run on the same server or may run on different servers that are collectively referred to herein as the server. It is understood that, in one example, electronic device 110 and the server may coordinate to perform one or more of the operations described herein with respect to FIG. 1.

Electronic device 110, running the local application and in communication with a server, may determine audible (e.g., spoken and/or voice) utterances (e.g., commands and/or instructions) from a user (e.g., user 105). For example, electronic device 110 may receive voice and/or spoken commands for information about a product. In one example, the local application run on electronic device 110 may optionally employ a natural-language understanding (NLU) and/or natural-language interpretation (NLI) engine (e.g., transcription engine) to process audible commands. Electronic device 110 may process voice and/or spoken commands and may determine corresponding instructions indicative of the voice and/or spoken commands. Electronic device 110 may send the instructions to the server. Alternatively, or additionally, electronic device 110 may send audio data to the server and server may employ a natural-language understanding (NLU) and/or natural-language interpretation (NLI) engine (e.g., transcription engine) to process a spoken and/or audible commands. In one example, the transcription engine may be part of the implementation engine described below.

As shown in FIG. 1, a user 105 may speak an audible utterance that may be processed by electronic device 110, and that may send information indicative of the audible utterance to catalog service 125 and may receive a response audible utterance from the catalog service 125 to present on the electronic device 110. For example, the user 105 may generate audible utterance 131 which may state "Search books available from author X," where X is an author's name. Audible utterance 131 may be processed by electronic device 110 (e.g., using a transcription engine) and information indicative of the audible utterance 131, which may include the audible utterance, may be sent the catalog service 125. Catalog service 125 may analyze the information indicative of the audible utterance 131, may perform an action in response to audible utterance 131, and may determine audible utterance 132 to present in response to the audible utterance 131 of the user 105. Audible utterance 132 and/or information indicative thereof, may be sent to electronic device 110 from catalog service 125 and audible utterance 132 may be presented audibly on electronic device 110. Audible utterance 132 may state "Start audio book Z by author X," where Z is a book title and X is an author's name. Catalog service 125 may then cause electronic device 110 to audibly present audio book Z by author X.

As the audible utterance 131 asked the catalog service to "Search books available from author X," the response of catalog service 125 including audible utterance 132 and causing electronic device 110 to "Start presenting audio book Z by author X" was not an accurate and/or appropriate response to audible utterance 131. The intent or goal of audible utterance 131 was to elicit catalog service 125 to determine and audibly present the books available to from author X (e.g., the books available to purchase on catalog service 125 by author X) via electronic device 110. Accordingly, an appropriate and/or accurate result by catalog service 125 would include determining and causing electronic device 110 to present a list of books available from author X. This may be a list of book titles from author X that are available for purchase on catalog service 125.

To determine and improve the accuracy of the catalog service 125, system 120 may analyze the results provided from catalog service 125. For example, exchanges 140 illustrates a series of exchanges between system 120 and catalog service 125 to analyze the performance of catalog service 125 and optionally improve the performance of catalog service 125.

To initiate the actions of determining and/or analyzing the performance of catalog service 125 and improving the performance of catalog service 125, an example process flow 150 is presented and may be performed, for example, by one or more modules of a server (e.g., running catalog service 125 and system 120) and/or electronic device 110 (e.g., running a local application). The server and/or electronic device 110 may include at least one memory that stores computer-executable instructions and at least one processor configured to access the at least one memory and execute the computer-executable instructions to perform various actions or operations, such as one or more of the operations in the process flow 150 of FIG. 1. It is understood that, in one example, electronic device 110 and the server may coordinate to perform one or more of the operations described herein with respect to FIG. 1.

At block 151, a server running the system 120 may determine an intent regarding a product and/or product information. As explained above, an intent may be a goal or intention to elicit certain information and/or a certain action from the catalog service regarding the product and/or product information. At block 152, a server running the system 120 may determine an utterance corresponding to the product and/or product information as well as intent information determined at block 151. For example, in exchanges 140, three different audible utterances are determined by system 120 (e.g., audible utterances 133, 135, and 137). The product or product information may be product identifiers, keywords, and/or other product information (e.g., product tile and/or description) corresponding to books by author X (e.g., for audible utterance 133) and/or book Y by author X (e.g., for audible utterances 135 and 137). The intent may be to elicit catalog service 125 to perform certain actions and/or tasks such as determine books by author X and/or book Y and to audibly present product information about the book (e.g., product information, title information, inventory information, product reviews, etc.). Alternatively, intent may be to elicit catalog service to identify the respective product (e.g., book Y) and audibly present an offer for more information.

At block 153, a server running the system 120 may present and/or send the audible utterance (e.g., audible utterances 133, 135 and 137) to catalog service 125 (e.g., via electronic device 110). In one example, system 120 may determine the audible utterance and may cause an electronic device different from electronic device 110 to present the audible utterance. Electronic device 110 may capture and/or observe the audible utterance. Alternatively, system 120 may send data (e.g., a file) to electronic device 110 that is indicative of the audible utterance. The data may simulate an audible utterance observed and/or captured by electronic device 110 and thus may be processed by electronic device 110. In yet another example, system 120 may send data indicative of the audible utterance directly to the catalog service 125, bypassing the electronic device 110. The data sent directly to the catalog service may be similar to the data that electronic device 110 would send to catalog service 125 after processing the utterance.

At block 154, the catalog service may process the audible utterance to determine a result. For example, the catalog service 125 may analyze an audible utterance and/or information indicative thereof to determine a product (e.g., product identifier) corresponding to the utterance and may further determine an action to perform based on the utterance. The action may include determine information about a product (e.g., product title, product price, product description, etc.) and/or purchase a product or place a product in a list or queue, for example. Based on the product identified in the utterance and the action (e.g., intent) identified in the utterance, the catalog service may perform the action and may generate a response to an audible utterance. The response audible utterance may explain that an action has been performed and may provide information about the action or based on the action. For example, if a product description is determined, the response utterance may audibly present the product description. Alternatively, if the action is to purchase a product, the response utterance may indicate that a product has been purchased.

Additionally at block 154, the system 120 may process the utterance determined by the system, the response utterance determined by the catalog service 125, the intent, the action performed by the catalog service 125, and/or the product (e.g., product identifier), using an embedding algorithm for example, to determine a relevance score indicative of the relevance of the response utterance and/or action of the catalog service in view of the original utterance or the product determined by the system 120. It is understood that the system may determine additional information about the action and/or response utterance (e.g., response data), such as whether the correct product identifier was determined by the catalog service notwithstanding whether the correct action was taken, and vice versa.

In the exchanges 140 illustrated in FIG. 1, in response to utterance 133 stating "Search all books by author X," the catalog service may respond with utterance 134 stating that "These books are available from author X" and go on to state the books. In another example, in response to utterance 135 stating "Search reviews for book Y by author X," the catalog service may respond with utterance 136 stating "Starting audio book Y by author X." In yet another example, in response to utterance 137 stating "Tell me about book Y," the catalog service may respond with utterance 138 stating "Book Y is available for purchase." The utterances determined by the catalog service may be audibly presented on electronic device 110 and/or may be visually presented on electronic device 110 and/or another electronic device with a display. Alternatively, the response utterance and/or information indicative thereof may be sent directly from catalog service 125 to system 120 to be analyzed by system 120.

At optional block 155, the system 120 may determine performance data based on the result. For example, the system may analyze the result data to determine performance metrics and the accuracy of the system 120 and may even identify errors on the system. As explained above, large amounts of synthetic utterances (e.g., thousands) may be generated and processed to determine errors and shortcomings of the catalog service. For example, with respect to a product type, an error or issue associated with a particular action (e.g., placing a product in a digital shopping cart), and/or any other part of the user experience may be identified.

Regarding utterance 133, the system may determine that utterance 134 was correct and/or accurate because the intent of utterance 133 was to elicit a list of books from catalog service 125 that are available on catalog service 125 and authored by author X. Regarding utterance 135, system 120 may determine that utterance 136 was partially correct because the catalog service correctly identified that utterance 135 was directed to book Y by author X, but partly incorrect because the correct response to utterance 135 would be to present reviews for book Y by author X, not to start audibly presenting the audio book of book Y. Regarding utterance 137, system 120 may determine that utterance 138 was partly correct because the catalog service correctly identified that utterance 137 was directed to book Y, but partly incorrect because the correct response to utterance 137 would be to provide product information (e.g., product description) about book Y, not to confirm that book Y is available for purchase.

At optional block 156, the system 120 may determine marketing data based on the result. For example, multiple utterances may be determined based on the same intent (e.g., utterances 133, 135 and 137) and the corresponding result for each utterance may be determined. Based on the results, the utterance and/or utterances that are deemed to be most accurate (e.g., the utterance that corresponds to the most relevant result) may be determined and may be used for marketing and/or advertising purposes (e.g., marketing slogans). It is understood that other marketing information may be gleaned from the results data. For example, it may be useful to know which product types or brands are most frequently identified in results for a given intent. Further, the result data may indicate that certain utterances are far superior at eliciting the correct response from the catalog service.

At optional block 157, based on the information determined from exchanges 140, system 120 may update and/or train catalog service 125 or a portion thereof, and/or may facilitate the updating and/or training of catalog service 125 or a portion thereof. For example, based on utterance 133 eliciting the correct response from catalog service 125 and utterances 135 and 137 producing partially incorrect responses, the catalog service can be improved. As shown in FIG. 1, updated catalog service 150 upon receiving utterance 139, which is the same utterance 131, may process the utterance and respond with utterance 141 stating that "These books are available from author X," and then stating the books available by author X on the catalog service. As the intent of utterance 139 is to elicit the catalog service to list the books available for purchase on the catalog service authored by author X, utterance 141 is relevant and an appropriate and correct response. Accordingly, whereas the relevance score for utterance 132 would be low, as the action of playing an audio book by author X does not align with the intent of utterance 131, the relevance score for utterance 141 would be very high.

Illustrative Process and Use Cases

Figure 2:
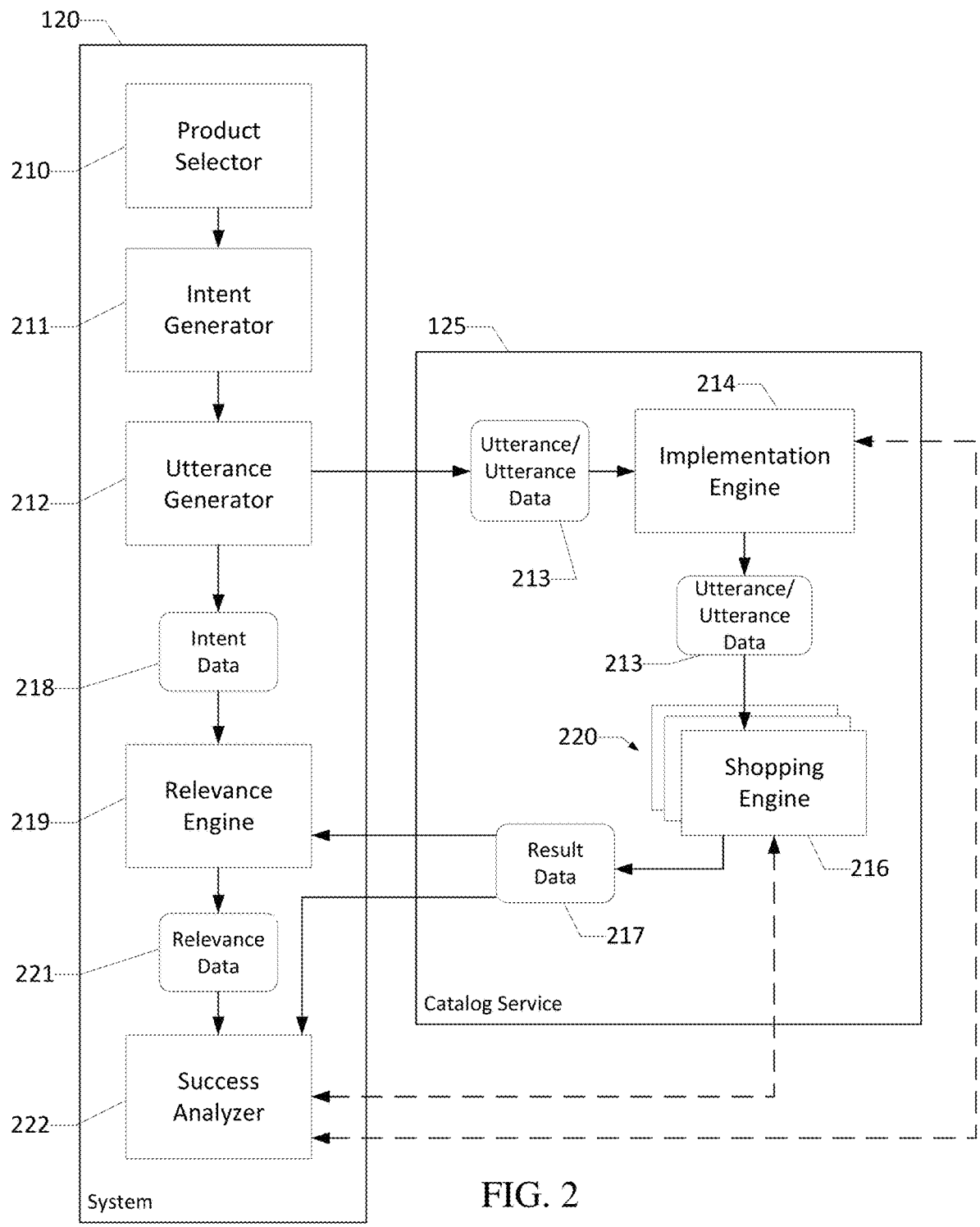
FIG. 2 is a schematic illustration of an example use case for determining an intent and an utterance, determining result data, and analyzing the result data, in accordance with one or more example embodiments of the present disclosure.

FIG. 2 depicts a schematic block diagram of an example process for determining an utterance regarding a product using a system and determining a result using a catalog service. Some or all of the blocks of the process flows in this disclosure may be performed in a distributed manner across any number of devices (e.g., servers and electronic devices). Some or all of the operations of the process flow may be optional and may be performed in a different order.

As shown in FIG. 2, system 120 may communicate with catalog service 125 such that utterance 213 may be determined by and sent and/or otherwise communicated from system 120 to catalog service 125 and result data 217 may be determined by and sent and/or otherwise communicated form catalog service 125 to system 120 for analysis of the result data 217. System 120 may include product selector 210, intent generator 211, utterance generator 212, relevance engine 219 and success analyzer 222. Further catalog service 125 may include implementation engine 214 and shopping engine 216.

Product selector 210 of system 120 may determine a product (e.g., a product identifier and/or product information) based on product database. The product may be a product, product information (e.g., a keyword) and/or a product identifier selected by product selector from product database that may be maintained and/or obtained from a catalog service. For example, a product identifier (e.g., an alphanumeric value) corresponding to a product may be determined.

The product identified by product selector 210 may be communicated to intent generator 211. Intent generator 211 may determine an intent corresponding to the product. As explained above the intent may be a goal and/or intention based on the product. For example, the intent may be an action corresponding to determining information, purchase information, inventory information, shipping information, and the like regarding the product. In one example, a product identifier may be selected and the intent may be a product price corresponding to the product identifier.

Based on the product determined by product selector 210 and the intent determined by intent generator 211, the utterance generator 212 of system 120 may determine one or more audible utterances. The audible utterance determined by system 120 may be referred to as a synthetic utterance as it is a computer generated spoken utterance intended to imitate a spoken and/or voice command from a human. In one example, the audible utterance may be an audio file (e.g., a waveform audio file). The utterance generator may include algorithms and/or logic to determine a sentence, sentences, a phrase and/or phrases, regarding the product and/or intent. For example, if the product identifier corresponds to a television that is 65 inches and the intent is to find a price, the utterance generator 212 may determine the sentence, "tell me the price of a 65 inch TV." Accordingly, it is understood that the utterance generator may determine words and sentences corresponding to the intent and product and may generate audio that sounds like a human voice using words and phrases.

The intent generator may further determine a degree of specificity for the utterance. For example, the intent generator may instruct the utterance generator to include a brand or manufacturer name. Other examples of specificity may include, for example, one or more of color, model, year, author, publisher, genre, size, fit, weight, and any other product attribute. Alternatively, the intent generator may instruct the utterance generator to include the top X (e.g., 5) rated 65 inch televisions. Alternatively, utterance generator not the intent generator may determine the degree of specificity.

The utterance 213 generated by utterance generator 212 may be processed by catalog service 125. As explained above, the utterance may be presented to electronic device 100 which may process the utterance and send the utterance and/or information indicative of the utterance to catalog service 125. Alternatively, such information may be determined by system 120 and sent and/or otherwise communicated directly to system 125. Utterance 213, which may include or be utterance data indicative of the utterance, may be processed by implementation engine 214 of catalog service 125.

Implementation engine 214 may analyze the utterance and/or information indicative thereof and may determine an action corresponding to utterance 213. Based on the action corresponding to utterance 213, implementation engine 214 may communicate utterance 213 to an appropriate an action module 220, which may be a one or more modules, components, applications, and/or engines for performing an action on catalog service 125 (e.g., streaming music or other media content, shopping, organizational tasks, etc.). In one example, implementation engine 214 may process utterance 213 and determine that utterance 213 is relevant to shopping engine 216. For example, where the utterance 213 involves an inquiry about the price of televisions, the implementation module may determine that the intent is related to determining television prices and thus may determine that the shopping engine 216 should process the utterance and/or utterance data corresponding to the utterance and thus may pass utterance 213 to shopping engine 216.

Shopping engine 216 may maintain and/or be in communication with a product databases or catalogs that may include product information such as product identifiers, product numbers, product names, product titles, product descriptions, product reviews, product prices, product manufacturers, product brands, product inventory, product images and/or videos, product sellers, vendors or distributors, and the like. Shopping engine 216 may include algorithms and/or logic to search the product database and/or catalog and determine or obtain data (e.g., information, files, etc.) regarding the product and/or may be able to compare products and determine information about several products.

Shopping engine 216 may also perform actions such as purchasing products and placing products in a list or queue (e.g., digital shopping cart, wish list, shopping list) associated with a user account.

Shopping engine 216 may perform an action based on the intent and/or the product identified in the utterance 213. Shopping engine 216 may also determine an audible utterance based on the action performed and/or information determined. Alternatively, shopping engine 216 may work with another module to determine the audible utterance. For example, shopping engine 216 may generate result data 217 which may include an audible utterance regarding the action performed by shopping engine 216 and/or may include information about the action performed. In one example, shopping engine 216 may perform the action of determining product information such as the product price for a television. Shopping engine 216 may determine an audible utterance corresponding to the price of the television. Additionally, shopping engine 216 may determine data (e.g., metadata) indicating the product (e.g., via product identifier) corresponding to the television for which the price was determined and/or indicating the action performed and the module and/or engine that performed the action. The shopping engine 216 may coordinate with the implementation engine 214 to present the audible utterance. Further the shopping engine 216 may coordinate with the implementation engine 214 to send the data regarding the product identifier to the system 120. Alternatively, the audible utterance and/or information corresponding thereto and/or the product data may be sent directly to the system 120. In one example, result data 217 may include both the audible utterance and/or information corresponding thereto as well as the product data (e.g., product identifier).

Relevance engine 219 may receive the result data from catalog service 125. Where the utterance generated from the catalog service 125 is caused to be presented on electronic device 110 by catalog service 125, the relevance engine may process the utterance, whether audible or visual, to determine the audible utterance and/or information indicative thereof. The relevance engine 219 may include one or more embedding algorithms (e.g., one or more embedding neural networks) and may input to such embedding algorithms the result data, the audible utterance generated by the catalog service 125 and/or intent data 218 from the utterance generator and/or intent generator. For example, intent data 218 may include the intent determined by the intent generator and/or the product information used by the utterance generator 212 to determine the utterance 213. Alternatively, or additionally, the intent data 218 may include utterance 213 and/or information indicative thereof. Using the embedding algorithm, relevance engine 219 may determine relevance data 221 indicative of a degree of similarity between the product and intent corresponding to the synthetic utterance generated by the system 120 and the result data and/or response utterance generated by the catalog service 125. For example, the output of the embedding algorithm may determine a similarity between a product identified by the intent generator 211 and a product identified in a response utterance by catalog service 125. In another example, other well-known models, algorithms, and approaches may be used to determine the relevance data. For example, product classifiers and segmentations, encoder/decoders for sequence-2-sequence models, TFIDs, and the like may be employed. In one example, product similarity may be determined using one or more of titles, descriptions, images, product categories, and the like.

Success analyzer 222 may analyze relevance data and/or result data received from relevance engine 219 and/or from catalog service 125 in the same manner as described above with respect to relevance engine 219. Success analyzer 222 may use the relevance data 221 and/or result data 217 to determine how catalog service 125 is performing. For example, using the relevance data, the success analyzer 222 may determine that the catalog service is determining accurate results because the product identifier corresponding to the response utterance generated by catalog service 125 is similar to the product identifier corresponding to the utterance 213. In one example, the determination of a product identifier similarity may be calculated based on existing product identifier nodes in an embedding vector space.

Success analyzer 222 may further analyze the actions performed by catalog service 125 to determine how well the catalog service 125 is performing. For example, success analyzer 222 may optionally be in communication with implantation engine 214 and/or action modules 220 and may analyze information about the performance of the catalog service 125 received from implementation engine 124 and/or action modules 220. For example, success analyzer 222 may analyze actions performed on action modules 220 and/or may analyze analysis of the utterance 213 on the implementation engine 214 to identify root problems and other issues with the implementation engine 214 and/or action modules 220.

The catalog service may assign a full match or partial match label to the result data 217. A full match may correspond to an exact match between the product corresponding to utterance 213 (e.g., product identifier) and the product corresponding to the response utterance and/or result data 217. A partial match may occur where the catalog service 125 performs an action corresponding to the same product (e.g., same product identifier) corresponding to utterance 213 but the action performed is inconsistent and/or inappropriate for the intent. For example, in FIG. 1, for utterance 131 stating "search books available from author X" the intent is determine a list of books available for purchase on the catalog service that are authored by author X. The response utterance, utterance 132, is inconsistent with the intent because utterance 132 indicates that the action performed by catalog service 125 is to cause electronic device 110 to play an audio book Z authored by author X. Accordingly, this is a partial match because book Z has a product identifier that is the same as the products corresponding to utterance 131, but the action performed by the catalog service 125 was not correct based on the intent.

In another example, the product identifier may perform the correct action (e.g., find the price of a product type), but the product identifier corresponding to the result data 217 may different than the utterance 213. This may occur if the same or similar products have different product identifiers. In this case, the success analyzer may further compare other product information (e.g., product title, product description, model number) to determine that the result by the catalog service 125 was highly relevant and thus the correct result. Also, in this case, the similarity score output by the embedding algorithm may be very high.

Success analyzer 222 may also determine other types of information based on the product, intent, utterance (e.g., utterance 213), the response utterance from the catalog service 125, result data 217, data from catalog service 125 (e.g., the action performed and/or product information) and any other information from catalog service 125 and/or system 120. For example, if the catalog service 125 does not determine any results, an issue may be detected with catalog service 125. For example, catalog service may determine that there are no results because the implementation engine 214 incorrectly determined the intent and/or action to be performed and sent the utterance to the wrong module and/or engine to perform the action. Additionally, there may have been an error from the transcription engine.

It is understood that the success analyzer 222 may use the foregoing information to train and/or facilitate the training of the catalog service to perform better. For example, the results may be used to train a search algorithm of the shopping module 216 to perform better searches. In another example, the results may be used to train the logic of the implementation module used to determine the intent and/or the action to be performed. It is further understood that the result data may be indicative of a predicted action performed in response to the synthetic utterance. For example, success analyzer may determine a predicted action such as adding a product to a shopping cart or deleting the product from the shopping cart and may use this information to determine success (e.g., adding a product to a shopping cart may be indicative of a successful result data).

Figure 3:
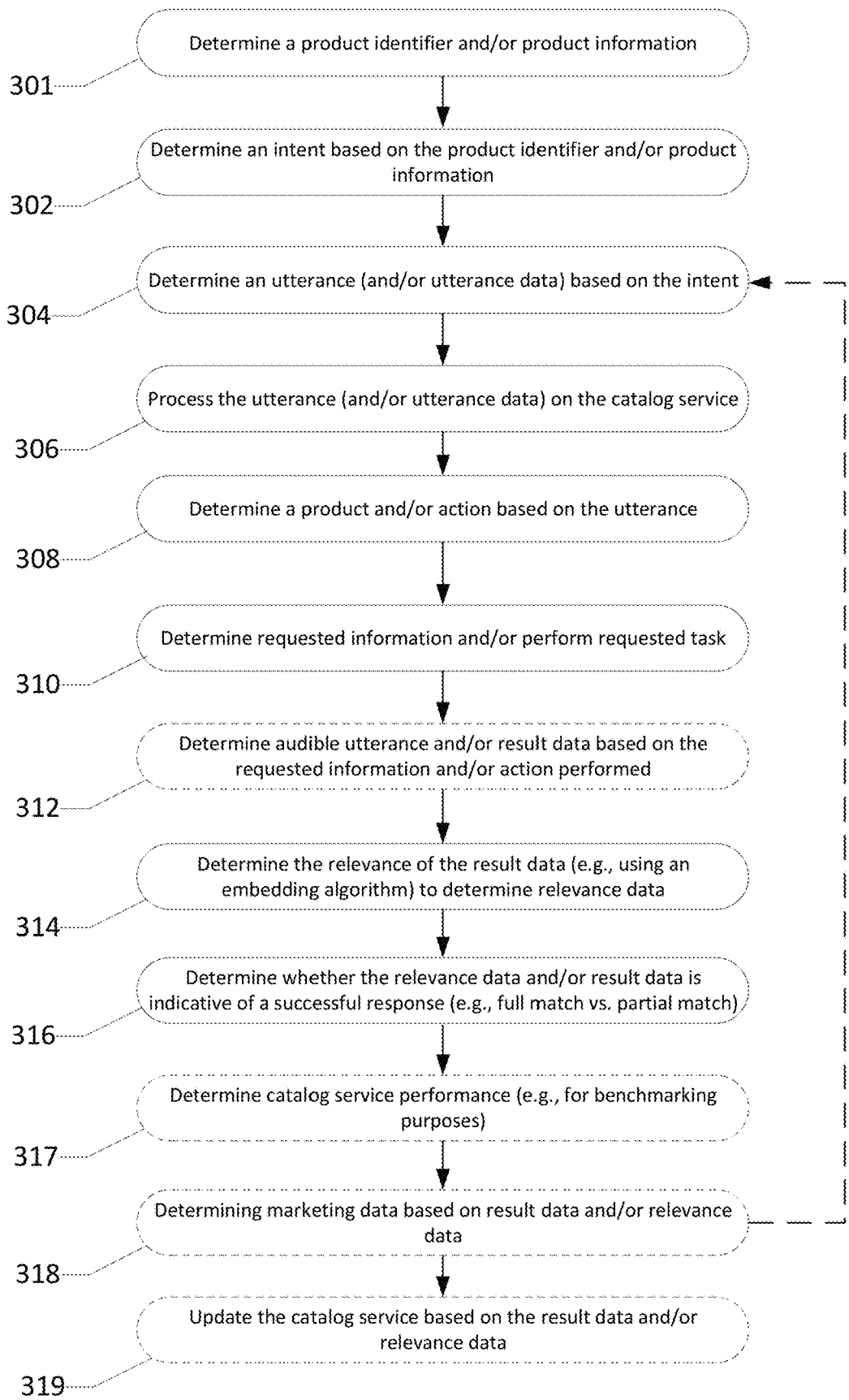
FIG. 3. is a schematic illustration of example process flow for determining an intent and an utterance, determining result data, and analyzing the result data, in accordance with one or more example embodiments of the present disclosure.

FIG. 3 depicts an example process flow for determining an intent and an utterance, determining a result by the catalog service based on the utterance and analyzing the result to determine the performance of the catalog service. Some or all of the blocks of the process flows in this disclosure may be performed in a distributed manner across any number of devices. Some are all of the operations of the process flow may be optional and may be performed in a different order.

At block 301, computer-executable instructions stored on a memory of a device, such as a server, may be executed to determine a product (e.g., a product identifier and/or product information) based on product database. The product may be a product, product information (e.g., a keyword) and/or a product identifier selected by product selector from product database that may be maintained and/or obtained from a catalog service. At block 302, computer-executable instructions stored on a memory of a device, such as a server, may be executed to determine an intent based on the product identifier and/or product information. As explained above, this may involve determining a product as well as a product identifier and/or product information (e.g., product title, product description, product image, etc.) corresponding to the product. This information may be retrieved from the product database maintained by the catalog service.

At block 304, computer-executable instructions stored on a memory of a device, such as a server, may be executed to determine an utterance (and/or utterance data) based on the intent, product identifier and/or product information. As explained above, the utterance may include words, phrases, and sentences that are audibly presented using a simulated human voice and may be saved as a file. The process for determining an utterance is described in greater detail below with respect to FIGS. 4 and 5. It is understood that steps 302 and 304 may be the same step.

At block 306, computer-executable instructions stored on a memory of a device, such as a server, may be executed to process the utterance (and/or utterance data) on the catalog service. As explained above, the utterance may be presented audibly and captured and/or observed by the electronic device. Alternatively, or additionally, the system may send the utterance and/or utterance data directly to the catalog service.

At block 308, computer-executable instructions stored on a memory of a device, such as a server, may be executed to process the utterance by determining a product (e.g., product identifier) and/or an action corresponding to the utterance. For example, the catalog service may determine that the utterance is requesting product information, requesting to purchase a product, requesting to place a product in a shopping cart, etc.

At block 310, computer-executable instructions stored on a memory of a device, such as a server, may be executed to determine the requested information and/or perform the requested task based on the action and product corresponding to the utterance. For example, the product may be a type of television (e.g., 65 inch television by manufacturer X) and the action may be to determine a price for the television.

At optional block 312, computer-executable instructions stored on a memory of a device, such as a server, may be executed to determine an audible utterance that may be indicative of the action performed. For example, the audible utterance may be a sentence that says the 65 inch television by manufacturer X is $800 dollars. An electronic device may be caused to present the audibly utterance. As explained above, the audible utterance and/or information about the action performed or product information (e.g., result data) may be shared directly with the system as an audible utterance and/or as data (metadata).

At block 314, computer-executable instructions stored on a memory of a device, such as a server, may be executed to determine the relevance of the result data to the utterance, intent, and/or product (e.g., product identifier) determined by the system. For example, the system may input the foregoing information into an embedding algorithm. In one example, the embedding algorithm may determine the similarity between the product identifier corresponding to the utterance determined by the system and the product identifier corresponding to the response data determined by the catalog service. The output of the embedding algorithm may be relevance data. Additionally, or alternatively, other well-known models, algorithms, and approaches may be used to determine the relevance of the result data to the utterance, intent and/or product. For example, product classifiers and segmentations, encoder/decoders for sequence-2-sequence models, TFIDs, and the like may be employed.

At block 316, computer-executable instructions stored on a memory of a device, such as a server, may be executed to determine whether the relevance data and/or result data is indicative of a successful response. It is understood that information known about a particular product (e.g., product name, type, model, description, etc.) may be used to determine relevance. For example, a successful response may be determined if the relevance data is indicative of a score that is above a certain threshold. In another example, the response data and/or relevance data may be used to determine if the response is indicative of a full match or a partial match, as explained above with respect to FIG. 2.

At optional block 317, computer-executable instructions stored on a memory of a device, such as a server, may be executed to determine catalog service performance metrics based on the relevance data and/or result data. For example, block 317 may be performed for benchmarking purposes to better understand how well the catalog service is performing generally and/or with respect to products, types of utterances, types of actions and/or action modules, and the like. The performance metrics may indicate a relevance score and/or match rate for a product, product identifier, or product type, for example. In one example, performance metrics for the most popular products on a catalog service (e.g., the bestselling product) may be determined. To quantify the performance of a catalog service, the relevance score may be compared to a certain threshold value and if the threshold value is satisfied, inferences may be made about the accuracy of the catalog service (e.g., a relevance score above a threshold value may be indicative of an accurate or high performing catalog service).

At optional block 318, computer-executable instructions stored on a memory of a device, such as a server, may be executed to determine marketing information based on the relevance data and/or result data. For example, based on the relevance data and/or result data, the utterance and/or utterances that are deemed to be most accurate (e.g., the utterance corresponding to the most relevant result) may be determined and may be used for marketing and/or advertising purposes (e.g., marketing slogans). It is understood that other marketing information may be gleaned from the results data. For example, it may be useful to know which product types or brands are most frequently identified in results for a given intent. Further, the result data may indicate that certain utterances are far superior at eliciting the correct response from the catalog service. After analyzing the success of the response at block 316, block 318 may determine marketing information and/or may re-initiate blocks 304-316 to determine multiple unique utterances and may determine marketing information by comparing the result data and relevance data corresponding to each of the utterances. The analysis of the various utterances may in the aggregate form the marketing information. In one example, the relevance score for several utterances may be compared to one another and/or compared to a certain threshold value and if the threshold value is satisfied, inferences may be made about the accuracy of the utterance corresponding to that relevance data. For example, the utterances with relevance scores above a given threshold value may be candidates for marketing campaigns.

At optional block 319, computer-executable instructions stored on a memory of a device, such as a server, may be executed to update the catalog service based on the response data and/or relevance data in view of the utterance, intent and/or product (e.g., product information and/or product identifier). As explained above, the algorithm and/or logic used to determine intents and/or actions by the implementation module and/or to determine the relevant products by the shopping engine may trained and/or modified to improve performance based on the relevance data or response data.

Figure 4:
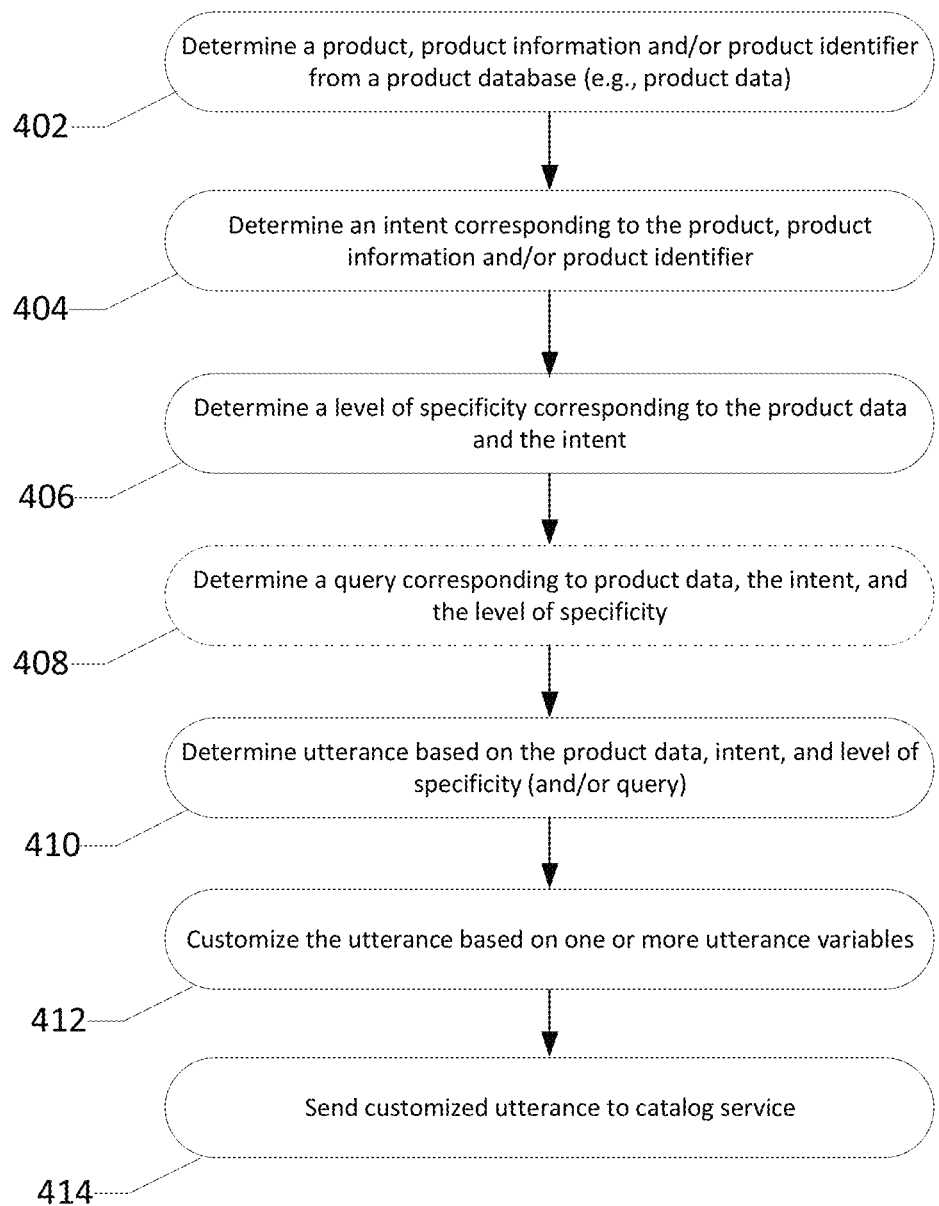
FIG. 4 is a schematic illustration of example process flow for determining product information, an intent and an utterance, in accordance with one or more example embodiments of the present disclosure.

FIG. 4 depicts an example process flow for determining an intent and an utterance. Some or all of the blocks of the process flow may be performed in a distributed manner across any number of devices. Some or all of the operations of the process flow may be optional and may be performed in a different order. It is understood that the process flow described below with respect to FIGS. 4 and 5 provides greater detail regarding blocks 302 and blocks 304 of FIG. 3.

At block 402, computer-executable instructions stored on a memory of a device, such as a server, may be executed to determine a product, product information (e.g., title, description, image, etc.) and/or product identifier from a product database. The product database may be maintained by the catalog service and accessed by the system to determine the product, product information and/or product identifier. For example, the product selected may be a bestselling product on the catalog service, may be a new product to the catalog service, an underperforming product on the catalog service, and/or may be chosen at random. At block 404, computer-executable instructions stored on a memory of a device, such as a server, may be executed to determine an intent corresponding to the product, product information and/or product identifier. As explained above, the intent may be an action to be performed by the catalog service. At block 406 computer-executable instructions stored on a memory of a device, such as a server, may be executed to determine a level of specificity corresponding to the product data and the intent.

Figure 5:
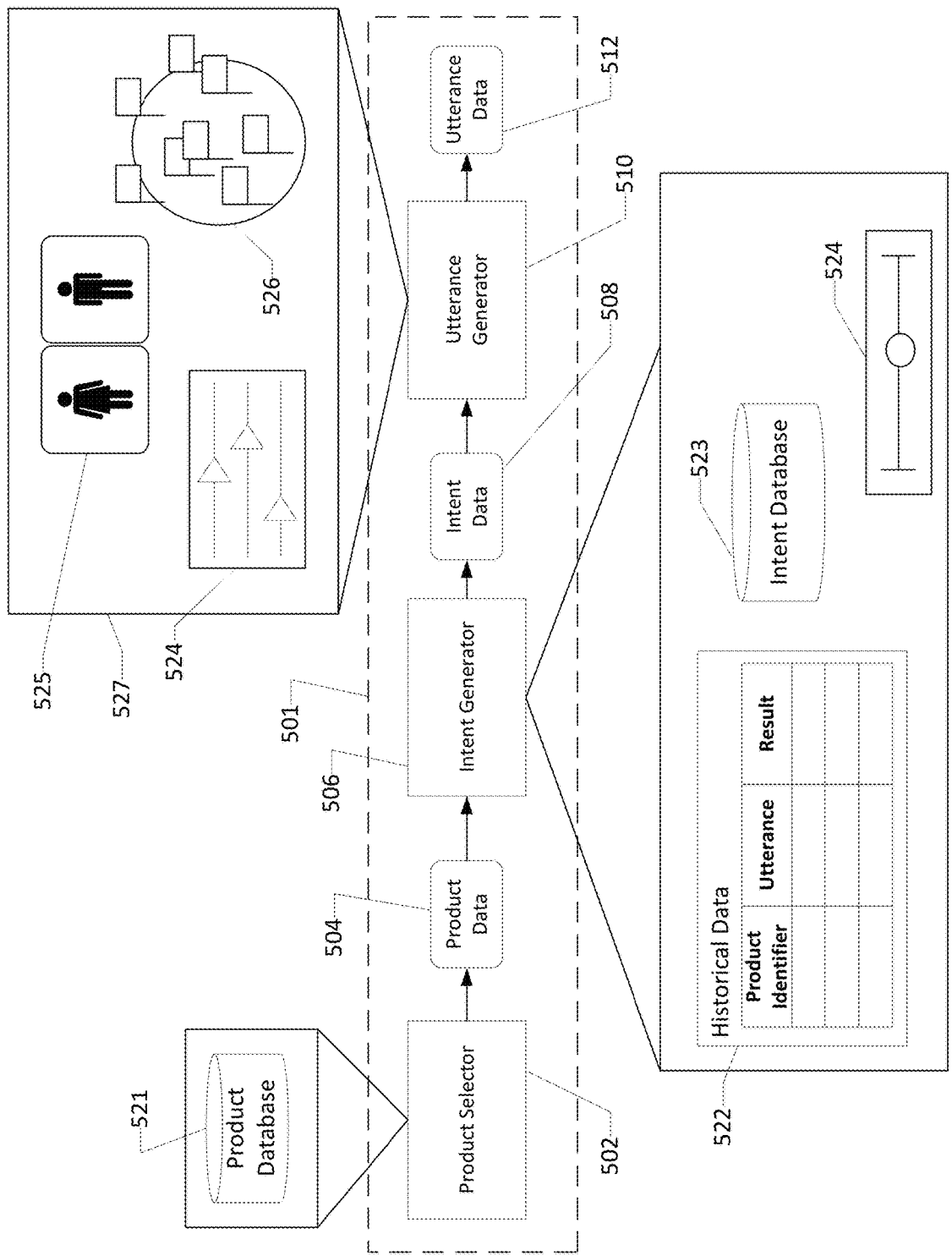
FIG. 5 is a schematic illustration of an example use case for determining product information, an intent and an utterance, in accordance with one or more example embodiments of the present disclosure.

Referring now to FIG. 5, a schematic illustration of an example use case for determining a product, an intent, and an utterance based on the product and the intent is illustrated. The process illustrated in FIG. 5 may be performed by system 501 which may be the same as system 120. As shown in FIG. 5, a product selector 502 may determine product data 504 based on product database 521. The product data 504 may be a product, product information and/or a product identifier selected by product selector 502 from product database 521. Product database 521 may be maintained and/or obtained from a catalog service.

Product data 504 may be communicated from the product selector to the intent generator 506. The intent generator 506 may use the product data 504 to determine an appropriate intent (e.g., action). The intent may be selected based on historical data database 522 which may be a database or catalog of previous utterances received by the catalog service. Historical data database 522 may include information such as a product identifier, utterance, and result (e.g., result data) and may include the intent for each entry. In another example, an intent database 523 may be consulted. The intent database may include several intents that may be applied to the product (e.g., product identifier) to form an utterance. For example, intent database 523 may include actions such as "check price," "search," "buy," "add to cart," "add to list," and the like.

Intent generator 506 may further include specificity selector 524 which may determine an appropriate specificity for the intent. A low specificity may be used to elicit a broad result from the catalog service. For example, a low specificity intent may be intended to elicit a result from the catalog service regarding a product type. In another example, the specificity selector may be set to determine medium specificity which may net results that involve, for example, a product type and a title that may be compared to a product type and product title identified by the product selector 502. Alternatively, the specificity selector 524 may be set to high specificity to elicit specific results such as, for example, product identifiers and/or model numbers that can be compared to product identifiers and/or model numbers determined by product selector 502. The specificity may be used to determine the relevance of the result data. For example, if the specificity is low, the types of results that correspond to an accurate and/or appropriate response are broad, compared to a high specificity. In one example, if the specificity is low, multiple different products (e.g., product identifiers or types) may correspond to an intent with low specificity. However, only one product (e.g., a specific product identifier or type) may correspond to the intent with a high specificity. It is understood that the specificity selector 524 may be used to determine the appropriate intent from intent database 523 and/or historical data database 522. It is also understood that, multi-turn synthetic conversations may be facilitated, starting with broad queries and then narrowing the specificity to elicit more specific results. This approach may be used to test and fine-tune new features of the catalog service.

Referring again to FIG. 4, at optional block 408, computer-executable instructions stored on a memory of a device, such as a server, may be executed to determine a query corresponding to product, the intent and/or the level of specificity. In one example, the intent may include a phrase or sentence an thus optional block 408 is not necessary. In another example, the intent may only include the action to be performed by the catalog service and a query including words to form a sentence or phrase must be determined to ultimately generate an audible utterance. In yet another example, the query may be determined at the same time as the audible utterance is determined.

At block 410, computer-executable instructions stored on a memory of a device, such as a server, may be executed to determine an audible utterance based on the product data, the intent, the level of specificity, and/or the query. The utterance may be determined using algorithms and/or logic to form sentences and/or phrases in a human-like voice that may be presented audibly (e.g., via an electronic device). At block 412, computer-executable instructions stored on a memory of a device, such as a server, may be executed to customize the utterance based on one or more utterance variables (e.g., sound and/or language variables).

At optional bock 414, computer-executable instructions stored on a memory of a device, such as a server, may be executed to send the customized utterance to the catalog service. For example, this step may involve causing a device to present the audible utterance in the vicinity of an electronic device that captures and/or observes the audible utterance, processes the utterance, and sends information to the catalog service that is indicative of the audible utterance. In another example, the system may send the utterance, or information indicative of the utterance, directly to the catalog service to be analyzed and processed by the catalog service.

Referring again to FIG. 5, utterance generator 510 may receive intent data and/or product data and may determine an audible utterance based on the intent data and/or product data. As explained above, the utterance generator may optionally determine a query (e.g., string of words) based on the intent data and/or the product data to elicit the action in the intent data from the catalog service. Alternatively, the intent generator may form the query by selecting an intent.

Utterance generator 510 may further determine utterance parameters 527 to modify and/or customize the utterance. For example, synthesized voice 525 for speaking the utterance may optionally be selected to imitate a male or female voice or may be gender neutral. Additionally, voice parameters 524 may be adjusted. For example, voice parameters 524 may include volume, timber, cadence, pitch, cadence, and any other parameter and/or attribute that can affect or alter a voice and/or audible words. Utterance parameters 527 may further include language parameters 527 which may cause the utterance to be spoken in different languages and/or with different accents or dialects from around the world. It is further understood that the intent generator 506 and/or utterance generator 510 may be improved using Bert (Bidirectional Encoder Representations from Transformers) models which may be trained to imitate utterances for a given product, in a given marketplace, for a given search history, etc.

Upon determining the utterance parameters 527, the audible utterance may be generated (e.g., as a file such as waveform file) as utterance data 512. Utterance data 512 may be sent or otherwise communicated from the system to the catalog service as described above. It is understood, that the same product data and intent data 508 may be used to determine a variety of utterances by altering the utterance parameters. For example, the effect of a language and/or accent or dialect of an utterance may be determined.

Illustrative Device Architecture

Figure 6:
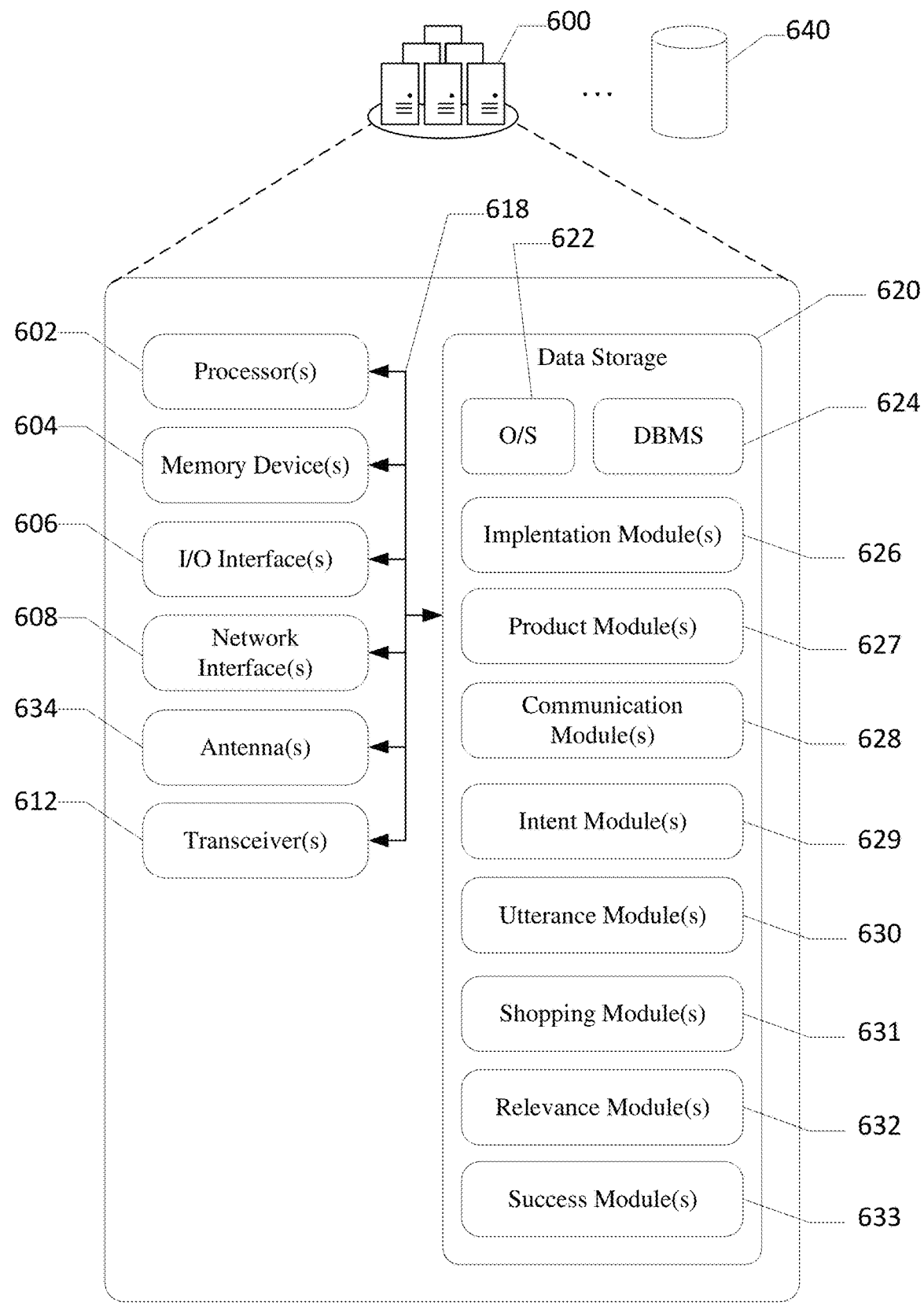
FIG. 6 is a schematic block diagram of a server in accordance with one or more example embodiments of the disclosure.

FIG. 6 is a schematic block diagram of an illustrative server 600 in accordance with one or more example embodiments of the disclosure. The server 600 may be one or more servers and may include any suitable computing device capable of receiving and/or sending data, and may optionally be coupled to devices including, but not limited to, electronic devices such as a connected device, smartphone, tablet, smart television, e-reader, one or more user devices (e.g., wearable devices and/or smart sensors), a desktop computer, a laptop computer, one or more servers, datastores, or the like. The server 600 may correspond to an illustrative device configuration for any servers of FIGS. 1-5 and/or any computing devices running the system and/or the catalog service. As explained above, server 600 may be one or more servers and catalog service and/or system may run on the same server or may run on different servers of server 600. Electronic device 640 may correspond to electronic device 110 and/or any other electronic device of FIGS. 1-5.

The server 600 may be configured to communicate via one or more networks with one or more servers, electronic devices, user devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 600 may include one or more processors (processor(s)) 602, one or more memory devices 604 (generically referred to herein as memory 604), one or more of the optional input/output (I/O) interface(s) 606, one or more network interface(s) 608, one or more transceivers 612, and one or more antenna(s) 634. The server 600 may further include one or more buses 618 that functionally couple various components of the server 600. The server 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the server 600. The bus(es) 618 may include, without limitation, a memory bus or a memory controller, a peripheral bus, an accelerated graphics port, and so forth.

The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of the execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more implementation module(s) 626, one or more product module(s) 627, one or more communication module(s) 628, one or more intent module(s) 629, one or more utterance module(s) 630, one or more shopping module(s) 631, one or more relevance module(s) 632, and/or one or more success module(s) 633. Some or all of these module(s) may be sub-module(s). Sub or all of these module(s) may be part of the catalog service and some or all of these modules may be part of the system. Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, user contact data, device pairing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the implementation module(s) 626 may include computer-executable instructions, code, or the like that are responsive to execution by one or more of the processor(s) 602 may perform functions including, but not limited to, overseeing coordination and interaction between one or more modules and computer executable instructions in data storage 620, determining user selected actions and tasks, and/or determining actions and/or intents associated with utterances. Implementation module 626 may further coordinate with communication module 628 to send messages to and receive messages from electronic device 110. Further, implementation module may optionally employ a natural-language understanding (NLU) and/or natural-language interpretation (NLI) engine (e.g., transcription engine) to process a spoken and/or audible commands.

The product module(s) 627 may include computer-executable instructions, code, or the like that are responsive to execution by one or more of the processor(s) 602 may perform functions including, but not limited to, maintaining and/or accessing a product database including a catalog of products and corresponding product information such as product identifier, product model, product type, product brand and/or manufacturer, product year or data, product description, product price, product inventory, product details and/or specifications and/or other product related information. The products in the product database may be products that are available for purchase on the catalog service. The product module 627 may be the same as and/or include product selector 502.

The communication module(s) 628 may include computer-executable instructions, code, or the like that responsive to execution by one or more of the processor(s) 602 may perform functions including, but not limited to, communicating with one or more devices, for example, via wired or wireless communication, communicating with electronic devices, communicating with one or more servers (e.g., remote servers), communicating with remote datastores and/or databases, sending or receiving notifications or commands/directives, communicating with cache memory data, and the like.

The intent module(s) 629 may include computer-executable instructions, code, or the like that are responsive to execution by one or more of the processor(s) 602 may perform functions including, but not limited to, determine an intent based on the product, product data, and/or product information (e.g., product identifier). As explained above, in one example, the intent may be determined by historical data and/or an intent database including different types of intents that may be selected. The intent module 629 may be the same as and/or include intent generator 506 and/or intent generator 211.

The utterance module(s) 630 may include computer-executable instructions, code, or the like that are responsive to execution by one or more of the processor(s) 602 may perform functions including, but not limited to, determining an audible utterance. The audible utterance may be determined based on the product, product data, product information, intent, and/or query. The audible utterance may be modified using utterance parameters. The audible utterance may be a file such as a waveform file or any other audio file. The utterance module 630 may be the same as and/or include utterance generator 510 and/or utterance generator 212.

The shopping module(s) 631 may include computer-executable instructions, code, or the like that are responsive to execution by one or more of the processor(s) 602 may perform functions including, but not limited to, overseeing shopping functionality and operations on server 600. For example, shopping module 629 may process utterances and/or information indicative thereof regarding products, product information, purchasing of products, placing products in lists and/or queues and the like. It is understood that the term products herein may include services. The shopping module 631 may be the same as and/or include shopping engine 216.

The relevance module(s) 632 may include computer-executable instructions, code, or the like that responsive to execution by one or more of the processor(s) 602 may perform functions including, but not limited to, determining relevance data. The relevance module may execute an embedding algorithm to process product data, intent data, utterance data and/or other relevant information to determine the relevance of a result generated by the catalog service to a product, intent, and/or utterance. The relevance module may output a relevance score and/or value. The relevance module 632 may be the same as and/or include relevance engine 219.

The success module(s) 633 may include computer-executable instructions, code, or the like that responsive to execution by one or more of the processor(s) 602 may perform functions including, but not limited to, comparing product data, intent data, utterance data, relevance data (e.g., metadata) and/or other relevant information to determine whether result data and/or an action performed by the catalog service is indicative of a successful response to the intent and/or utterance. The success module 633 may be the same as and/or include success analyzer 222.

Referring now to other illustrative components depicted as being stored in the data storage 620, the O/S 622 may be loaded from the data storage 620 into the memory 604 and may provide an interface between other application software executing on the server 600 and hardware resources of the server 600. More specifically, the O/S 622 may include a set of computer-executable instructions for managing hardware resources of the server 600 and for providing common services to other application programs (e.g., managing memory allocation among various application programs). In certain example embodiments, the O/S 622 may control execution of the other program module(s) for content rendering. The O/S 622 may include any operating system now known or that may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the server 600, the optional input/output (I/O) interface(s) 606 may facilitate the receipt of input information by the server 600 from one or more I/O devices as well as the output of information from the server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 600 or may be separate. The I/O devices may further include, for example, any number of peripheral devices such as data storage devices, printing devices, and so forth.

The optional I/O interface(s) 606 may also include an interface for an external peripheral device connection such as universal serial bus (USB), FireWire, Thunderbolt, Ethernet port or other connection protocol that may connect to one or more networks. The optional I/O interface(s) 606 may also include a connection to one or more of the antenna(e) 634 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The server 600 may further include one or more network interface(s) 608 via which the server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna(e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a Bluetooth antenna configured to transmit or receive signals in accordance with established standards and protocols, such as Bluetooth and/or BLE. Alternatively, or in addition to, antenna(e) 634 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum (e.g., 900 MHz).

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the server 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the server 600. The transceiver(s) 612 may further include a low noise amplifier (LNA), additional signal amplifiers, an analog-to-digital (A/D) converter, one or more buffers, a digital baseband, or the like.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the server 600 and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the server 600 may include alternate and/or additional hardware, software, or firmware components beyond those described or depicted without departing from the scope of the disclosure. More particularly, it should be appreciated that software, firmware, or hardware components depicted as forming part of the server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining a first product identifier associated with a first product;
   generating a first synthetic utterance based on product information associated with the first product and from a catalog service;
   modifying a parameter of the first data resulting in second data with an audio property different from the first data, the second data indicative of a second synthetic utterance;
   applying the second data to the catalog service to generate first result data, the first result data comprising an audible utterance and output result data corresponding to a product associated with the second synthetic utterance;
   determining a second product identifier associated with the first result data, the second product identifier corresponding to a second product;
   applying the first product identifier and second product identifier to an embedding algorithm;
   determining, based on the embedding algorithm, a degree of similarity between the first product and the second product; and
   updating the catalog service using the second data and the first result data.

2. The method of claim 1, further comprising:
   determining an intent database comprising intents;
   determining from the intent database, a first intent corresponding to a first action associated with a first module;
   generating the first data based on the first intent;
   determining a second action associated with the first result data; and
   determining whether the first action and the second action are the same.

3. The method of claim 2, further comprising:
   determining that the first action is different from the second action; and
   determining, based on the first action being different from the second action, that second action was performed by a second module different than the first module.

4. The method of claim 1, further comprising:
   determining first product information indicative of the first product;
   determining second product information indicative of the second product; and
   determining that the first product is the same as the second product based on the first product information and second product information.

5. A method comprising:
   storing, in a product database, product attributes of a plurality of products;
   determining, by one or more computing devices, first product information corresponding to a first product of the plurality of products, the product information comprising one or more of the attributes stored in the product database;
   generating, by one or more computing devices, a synthetic utterance based on the first product information and an intent, wherein the synthetic utterance is generated by including at least one of the stored attributes in a sentence or phrase;
   applying, by one or more computing devices, the synthetic utterance to a catalog service to determine result data corresponding to a second product associated with second product information;
   applying, by one or more computing devices, the second product information and the first product information to an embedding algorithm;
   determining, by one or more computing devices, a degree of similarity between the first product and the second product; and updating, by one or more computing devices, the catalog service using the degree of similarity between the first product and the second product.

6. The method of claim 5, further comprising determining a performance value based on the degree of similarity, the performance value indicative of a degree of accuracy of the catalog service.

7. The method of claim 5, further comprising:
determining that the degree of similarity satisfies a threshold value; and
determining, based on the degree of similarity satisfying the threshold value, that the first data corresponds to an accuracy metric associated with the synthetic utterance.

8. The method of claim 5, further comprising:
determining first product identifier corresponding to the first product;
determining a second product identifier corresponding to the second product;
determining that the second product identifier is not the same as the first product identifier;
determining that the first product information is the same as the second product information; and
determining that the first product is the same as the second product based on similarity score, the first product information, and the second product information.

9. The method of claim 5, further comprising:
determining a database of actions based on historic data for the catalog service;
determining an action from the database of actions, the action associated with the first product; and
generating the first data based on the action.

10. The method of claim 5, further comprising:
determining a first action selected from one of determine a price of the first product, purchase the first product, add the first product to a digital shopping cart, add the first product to a list, or determine an inventory amount of the first product; and
determining the first data based on the first action.

11. The method of claim 5, further comprising:
determining a first action to be performed by a first module, the first action associated with the first product;
determining the first data based on the first action;
determining, based on the result data, a second action performed by a second module; and
determining that the first action and the second action are not the same.

12. The method of claim 5, further comprising:
determining a degree of specificity;
determining a query based on the degree of specificity; and
generating the first data based on the degree of specificity.

13. The method of claim 5, wherein the first product information includes one or more of product type, product identifier, product title, product review, product image, product description, product inventory, product model number, or manufacturer information.

14. A system comprising:
memory configured to store computer-executable instructions, and
at least one computer processor configured to access memory and execute the computer-executable instructions to:
storing, in a product database, product attributes of a plurality of products;
determine first product information corresponding to a first product, the product information comprising one or more of the attributes stored in the product database;
generate a synthetic utterance based on the first product information and an intent, wherein the synthetic utterance is generated by including at least one of the stored attributes in a sentence or phrase;
apply the synthetic utterance to a catalog service to determine result data corresponding to a second product associated with second product information;
apply the second product information and the first product information to an embedding algorithm; and
determine a degree of similarity between the first product and the second product;
updating the catalog service using the degree of similarity between the first product and the second product.

15. The system of claim 14, wherein the at least one computer processor is further configured to access memory and execute the computer-executable instructions to determine a performance value based on the degree of similarity, the performance value indicative of a degree of accuracy of the catalog service.

16. The system of claim 14, wherein the at least one computer processor is further configured to access memory and execute the computer-executable instructions to:
determine that the degree of similarity satisfies a threshold value; and
determine, based on the degree of similarity satisfying the threshold value, that the first data corresponds to an accuracy metric associated with the audible utterance.

17. The system of claim 14, wherein the at least one computer processor is further configured to access memory and execute the computer-executable instructions to:
determine first product identifier corresponding to the first product;
determine a second product identifier corresponding to the second product;
determine that the second product identifier is not the same as the first product identifier;
determine that the first product information is the same as the second product information; and
determine that the first product is the same as the second product based on similarity score, the first product information, and the second product information.

18. The system of claim 14, wherein the at least one computer processor is further configured to access memory and execute the computer-executable instructions to:
determine a database of actions based on historic data for the catalog service;
determine an action from the database of actions, the first action associated with the first product; and
determine the first data based on the action.

19. The system of claim 14, wherein the at least one computer processor is further configured to access memory and execute the computer-executable instructions to:
determine a first action selected from one of determine a price of the first product, purchase the first product, add the first product to a digital shopping cart, add the first product to a list, or determine an inventory amount of the first product; and
generate the first data based on the first action.

20. The system of claim 14, wherein the first product information includes one or more of product type, product identifier, product title, product review, product image, product description, product inventory, product model number, or manufacturer information.

\* \* \* \* \*

UNITED STATES PATENT AND TRADEMARK OFFICE
CERTIFICATE OF CORRECTION

PATENT NO. : 11,816,712 B1
APPLICATION NO. : 17/031562
DATED : November 14, 2023
INVENTOR(S) : Leon Portman, Gary Weiss and Yotam Yarden It is certified that error appears in the above-identified patent and that said Letters Patent is hereby corrected as shown below:

In the Specification

Column 11, Line 21 should read:
-- service 125 received from implementation engine 214 and/ --.

Column 11, Line 52 should read:
-- may be different than the utterance 213. This may occur if the --.

Signed and Sealed this
Second Day of July, 2024

Katherine Kelly Vidal
*Director of the United States Patent and Trademark Office*